United States Patent [19]

Ewing et al.

[11] Patent Number: 5,132,495

[45] Date of Patent: Jul. 21, 1992

[54] SUBMERSIBLE SPLICE COVER WITH RESILIENT CORRUGATED AND SECTIONS

[75] Inventors: Jack C. Ewing, Ormond Beach; J. William Venezia, Orlando, both of Fla.

[73] Assignee: Homac Mfg. Company, Ormond Beach, Fla.

[21] Appl. No.: 644,768

[22] Filed: Jan. 23, 1991

[51] Int. Cl.⁵ .............................................. H01B 17/10
[52] U.S. Cl. ............................ 174/138 F; 174/84 C; 174/84 R
[58] Field of Search ................ 174/84 C, 84 R, 84 S, 174/90, 138 F, 88 R, 70 S, 74 A, 93, 72 R, 74 R; 138/108, 109, 110, 121

[56] References Cited

U.S. PATENT DOCUMENTS

| | | | |
|---|---|---|---|
| 1,291,460 | 1/1919 | Finley | 174/84 S |
| 2,674,647 | 4/1954 | Dibner | 174/87 |
| 2,864,591 | 12/1958 | Frink | 138/109 |
| 3,009,986 | 11/1961 | Stephens | 174/84 |
| 3,173,989 | 3/1965 | Neaderland | 174/84 |
| 3,213,186 | 10/1965 | Raila et al. | 174/84 |
| 3,281,524 | 10/1966 | Lynch, Jr. et al. | 174/84 |
| 3,404,216 | 10/1968 | Amann et al. | 174/84 |
| 3,518,600 | 6/1970 | Urani | 337/201 |
| 4,283,597 | 8/1981 | Cooper, Jr. | 174/138 F |
| 4,704,500 | 11/1987 | Shimirak | 174/93 |
| 4,740,170 | 4/1988 | Lee et al. | 439/177 |
| 4,837,409 | 6/1989 | Klosin | 174/88 R |
| 4,959,508 | 9/1990 | McGrane | 174/84 C |

Primary Examiner—Leo P. Picard
Assistant Examiner—Hyung S. Sough
Attorney, Agent, or Firm—John E. Benoit

[57] ABSTRACT

A splice cover adapted for use with a submersible splice and interconnecting insulated cables comprising a resilient substantially cylindrical center section and resilient corrugated end sections. The corrugations provide interior and exterior grooves and ridges which permit expansion and extension of the end section so as to accept different size insulated cables while maintaining a watertight fit between the cover and the insulated cable and an interference fit between the splice and the splice cover.

4 Claims, 2 Drawing Sheets

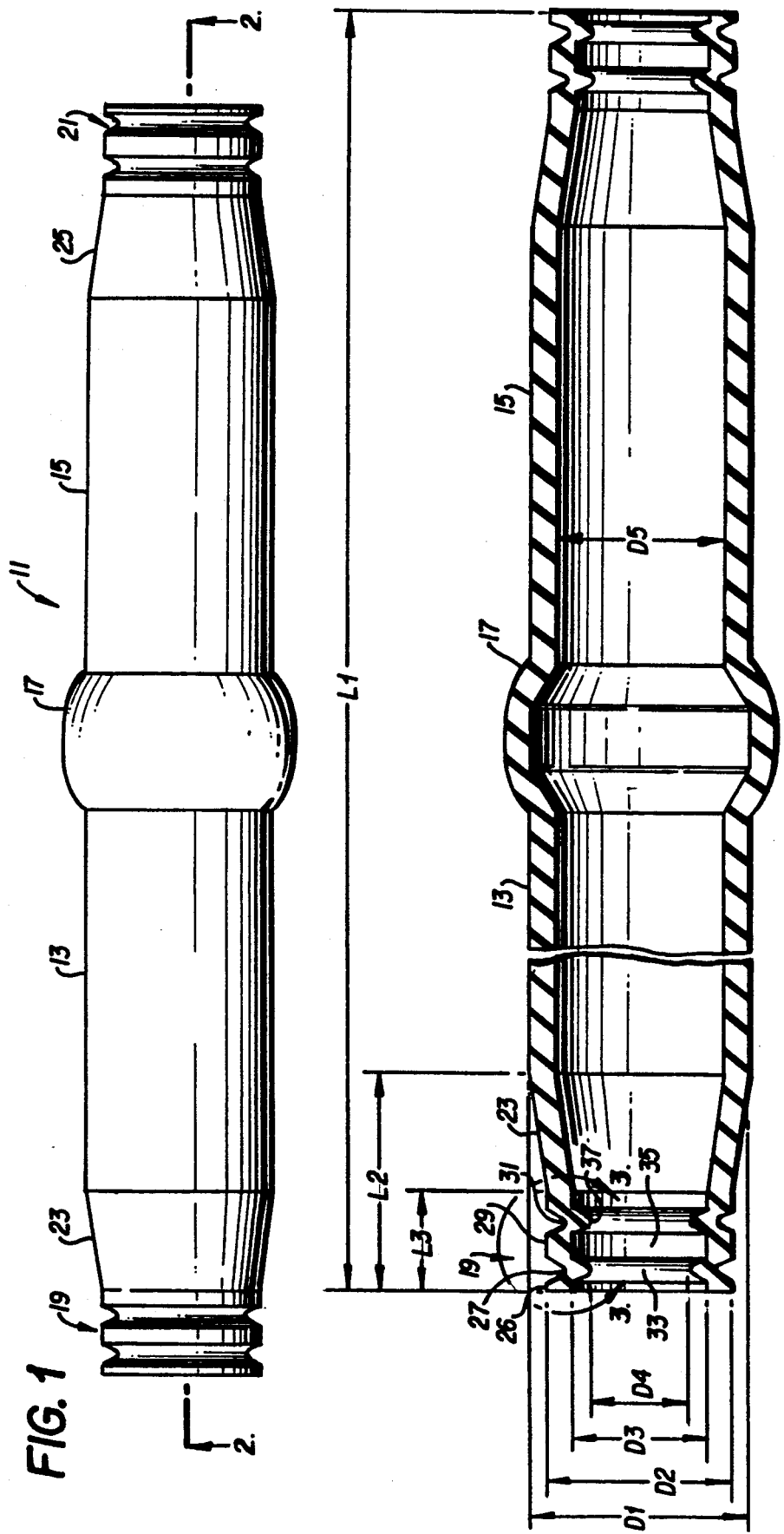

SUBMERSIBLE SPLICE COVER WITH RESILIENT CORRUGATED AND SECTIONS

This invention relates generally to splice covers and more particularly to submersible splice covers which provide watertight insulation.

BACKGROUND OF THE INVENTION

Underground residential electric and distribution systems have primary and secondary voltage cables direct buried in trenches, usually at curbside. To maintain the watertight integrity of these systems, all cable connectors, including splices, are insulated watertight.

Advances in elastomer technology have generated the development of insulated splice covers which are now in common use. They have largely eliminated the use of tape and various compounds for insulating splices because of the considerable installed costs for these systems. The use of these splice covers substantially reduces such costs. Splice covers have also been applied over splices and cables by heat shrinking. This not only requires expensive equipment at the site, but also means that the cover must be destroyed in order to have access to the splice. Accordingly, elastomeric splice covers which are slidable along the cables and the splice itself are now in use. These provide watertight integrity about the cable insulation and an interference fit between the cover and splice so as to enhance heat dissipation.

The splice assemblies that are the subject of this invention are generally for use on cables rated up to 600 volts. A typical splice cover has a watertight fit about the cables where the ends of the splice cover meet with the cables. As is generally the case at the present time, the ends of these splice covers include circular ribs within the ends so as to enhance the watertight integrity of the splice. One problem inherent with this type of splice is that while the splice itself is flexible, the ends are not expandable to any degree and, therefore, a specific splice must be used for a specific size cable.

Accordingly, it is an object of this invention to provide a splice cover having ends which provide both radial expansion and longitudinal extension.

A further object of the invention is to provide a splice cover which can accommodate more than one size of cable while maintaining the watertight integrity of the fit about the cable insulation and an interference fit between the splice and the cover.

These and other objects of the invention will become obvious from the following description taken together with the drawings.

BRIEF SUMMARY OF THE INVENTION

The invention provides a splice cover adapted for use with a submersible splice and interconnecting insulated cables which comprises a resilient substantially cylindrical center section and resilient and extensible corrugated end sections. The resilient center section is preferably of a dimension which provides an interference fit with the splice. The corrugated end sections include interior and exterior parallel grooves and ridges. These grooves and ridges permit radial expansion and longitudinal extension of the area of the cover which encloses the cable insulation. The resulting cover permits use of various size insulated cables, providing watertight integrity about the cable insulation while maintaining an interference fit between the splice and the splice cover.

BRIEF DESCRIPTION OF THE DRAWINGS

FIG. 1 is a side elevational view of one embodiment of the present invention;

FIG. 2 is a sectional view taken along the lines 2—2 of FIG. 1;

DETAILED DESCRIPTION OF THE PREFERRED EMBODIMENTS

Figure 5:
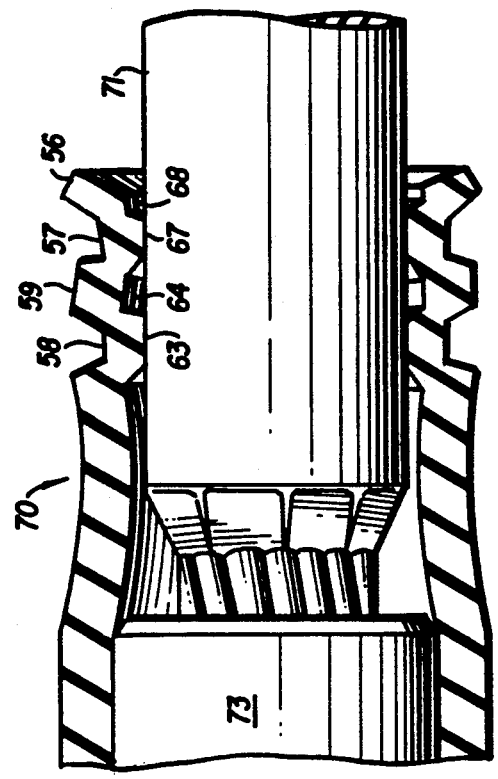
FIG. 5 is a partial sectional view of the embodiment of FIG. 2 installed about an insulated cable and splice.

FIG. 1 discloses a flexible splice cover having a central configuration similar to that disclosed in U.S. Pat. No. 4,959,508 issued Sep. 25, 1990. That particular splice cover includes a central recess which mates with an exterior rib about a splice. This configuration provides a means for centering the splice and maintaining an interference fit between the splice and the cover.

Splice cover 11 has two body sections 13 and 15 interconnected by central recess section 17. The splice terminates at its ends in corrugated sections 19 and 21. In this particular embodiment, the corrugated sections are connected to the central sections by means of tapered sections 23 and 25. The splice cover is molded of a resilient material such as an elastomer. This material is now well known in this art and is used to provide watertight covers for underground splice apparatus.

Turning to FIG. 2, it can be seen that the corrugations on either end are substantially identical. Each corrugation, such as corrugation 19, includes outer ribs 26 and 29, which alternate with outer grooves 27 and 31. The inner portion of the end of the splice includes grooves 32 and 35, which alternate with ridges 33 and 37. All the grooves and ridges are substantially parallel to each other and are located such that the grooves in the outer surface lie in substantially the same plane as the ridges in the inner surface and vice versa.

When tapered section 23 is used, diameter D2 of the outer ribs is less than the outer diameter D1 of center cylindrical section 13. The relative diameters are indicated as D1, D2, D3, and D4. This structure provides a cover which can accommodate substantially different size insulated cables while maintaining the watertight integrity between the cable insulation and the cover. Thus, cables having different predetermined diameters may be used with this cover. Regardless of the size of the cable, so long as it is within the predetermined limits, inner ridges 33 and 37 ensure watertight integrity between the insulated cable and splice cover. It is to be understood that a cover without the tapered sections may be used and still maintain the interference fit and watertight integrity provided by the corrugated end section of the present invention so as to accommodate a limited number of cable sizes. The use of the tapered section is preferable since it reduces the size of the air pocket, thus increasing heat transfer.

EXAMPLE

FIGS. 1 and 2

An example of a satisfactory splice cover, the cover illustrated in FIGS. 1 and 2, has the following dimensions:

```
D1 = 0.812 Inch
D2 = 0.688 Inch
D3 = 0.500 Inch
D4 = 0.360 Inch
D5 = 0.625 Inch
L1 = 5.5   Inches
L2 = 1.634 Inches
L3 = 0.750 Inches
```

The tapered section has an angle from the horizontal of 8°.

FIG. 3

```
D1 = 0.812 Inch
D2 = 0.688 Inch
D3 = 0.500 Inch
D4 = 0.360 Inch
D5 = 0.625 Inch
L1 = 5.5   Inches
L2 = 1.634 Inches
L3 = 0.750 Inches
```

Figure 3:
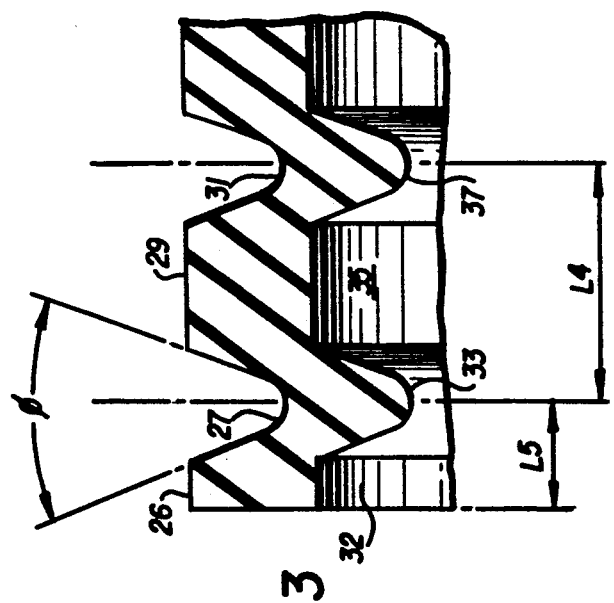
FIG. 3 is an enlarged view taken along the lines 3—3 of FIG. 2.

Referring to FIG. 3, the distance L4 between parallel grooves and parallel ridges of 0.187 inch, and the distance L5 between the outer ridge and the outer groove is 0.078 inch. The angle between the side walls of the grooves is 45°.

Figure 4:
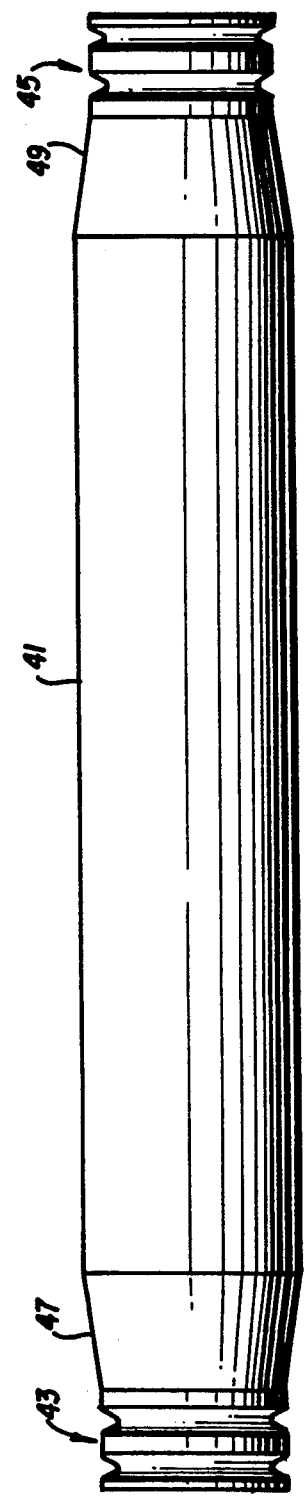
FIG. 4 is a side elevational view of a further embodiment of the present invention.

Referring to FIG. 4, there is shown a splice cover 41 which has a constant diameter throughout its central length but at its ends terminates at corrugations 43 and 45, which are connected to the central section by tapered edges 47 and 49 in substantially the same manner as that disclosed for the factor of FIGS. 1 and 2.

Referring to FIG. 5, there is shown a partial sectional view of splice cover 70 of the present invention in place about insulated cable 71 and splice 73. The main body of cover 70 is shown in an interference fit about splice 73. Splice cover 70 terminates in ridges 56, 59, 63 and 67 and grooves 57, 58, 64 and 68. As will be evident, interior ridges 63 and 67 are slightly flattened and the corrugated section extends further in length over the insulation of cable 71. The expansion and extension of the ridges ensures a watertight configuration. While additional grooves and ridges may be used, it has been found that the configuration having two internal ridges provides the required watertight integrity.

It is to be understood that the above description and associated drawings are descriptive only, since modifications could occur without departing from the invention, the scope of which is limited only by the following claims.

We claim:

1. A splice cover adapted for use with a submersible splice and interconnecting insulated cables, said splice cover comprising
   a resilient substantially cylindrical center section;
   resilient corrugated cylindrical end sections having an interior diameter D3, said end sections having a plurality of interior and exterior grooves and ridges, the exterior grooves lying in substantially the same cross-sectional plane as the interior ridges and the exterior ridges lying in substantially the same cross-sectional plane as the interior grooves;
   said interior ridges having an interior diameter D4, diameter D4 being less than diameter D3;
   whereby said corrugated end sections and the associated interior ridges are radially expandable and longitudinally extensible so as to accept cables of different diameters while maintaining watertight integrity between the insulated cables and the interior ridges of the corrugated end sections.

2. The splice cover of claim 1 wherein each of said corrugated end sections comprises at least two internal and external grooves and ridges.

3. The splice cover of claim 1 further comprising
   resilient tapered cylindrical sections interconnecting said center section with said end sections.

4. The splice cover of claim 1 wherein said center section and said end sections are of a single unitary molded elastomer.

* * * * *

UNITED STATES PATENT AND TRADEMARK OFFICE
CERTIFICATE OF CORRECTION

PATENT NO. : 5,132,495
DATED : July 21, 1992
INVENTOR(S) : Ewing et al It is certified that error appears in the above-identified patent and that said Letters Patent is hereby corrected as shown below:

On title page, item [54], and col. 1, lines 1-2, should read as follows:

SUBMERSIBLE SPLICE COVER WITH RESILIENT CORRUGATED END SECTIONS

Signed and Sealed this

Twenty-fourth Day of August, 1993

Attest:

BRUCE LEHMAN

*Attesting Officer*  *Commissioner of Patents and Trademarks*